(12) United States Patent
Valluri et al.

(10) Patent No.: US 9,654,341 B2
(45) Date of Patent: May 16, 2017

(54) CLIENT DEVICE AWARENESS OF NETWORK CONTEXT FOR MOBILE OPTIMZATION

(71) Applicant: Cisco Technology, Inc., San Jose, CA (US)

(72) Inventors: Vamsidhar Valluri, Mountain View, CA (US); Parameswaran Kumarasamy, Bangalore (IN); Daniel G. Wing, San Jose, CA (US); Parag Pritam Thakore, Los Gatos, CA (US); Anand Oswal, Pleasanton, CA (US); Shivangi Sharma, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 14/185,075

(22) Filed: Feb. 20, 2014

(65) Prior Publication Data

US 2015/0236909 A1   Aug. 20, 2015

(51) Int. Cl.
| | | |
|---|---|---|
| *H04L 29/06* | (2006.01) | |
| *H04L 12/24* | (2006.01) | |
| *H04W 24/02* | (2009.01) | |
| *H04L 1/00* | (2006.01) | |
| *H04L 1/20* | (2006.01) | |

(Continued)

(52) U.S. Cl.
CPC ........ *H04L 41/0836* (2013.01); *H04L 1/0026* (2013.01); *H04L 1/20* (2013.01); *H04L 41/083* (2013.01); *H04L 47/11* (2013.01); *H04L 47/2458* (2013.01); *H04L 69/163* (2013.01); *H04W 24/02* (2013.01); *H04W 28/0273* (2013.01); *H04L 67/322* (2013.01);

(Continued)

(58) Field of Classification Search
CPC ..... H04L 12/24; H04L 29/06; H04L 41/0836; H04L 69/16; H04L 41/083; H04L 69/04; H04L 67/2847; G06F 15/16; G06F 15/173; H04W 76/00
See application file for complete search history.

(56) References Cited

U.S. PATENT DOCUMENTS

| | | | |
|---|---|---|---|
| 6,757,245 B1 * | 6/2004 | Kuusinen | H04W 28/18 370/235 |
| 7,440,971 B2 | 10/2008 | Toebes et al. | |

(Continued)

OTHER PUBLICATIONS

Wikipedia, "Slow-start", [online]. Oct. 26, 2013. [retrieved on Dec. 24, 2013]. Retrieved from the Internet: <URL: http://en.wikipedia.org/w/index.php?title=Slow-start&oldid=578870936>, pp. 1-3.

(Continued)

*Primary Examiner* — Jae Y Lee
*Assistant Examiner* — Aixa A Guadalupe-Cruz
(74) *Attorney, Agent, or Firm* — Leon R. Turkevich

(57) ABSTRACT

In one embodiment, a method comprises obtaining, by a client device via a wireless data link with a wireless access point, information from a network device within a data network reachable via the wireless access point, the information describing network conditions associated with a service provided to the client device via the data network; and the client device optimizing a transmission control protocol (TCP) communication, via the wireless data link, for optimization of the service provided by the client device.

20 Claims, 5 Drawing Sheets

(51) Int. Cl.
*H04W 28/02* (2009.01)
*H04L 12/833* (2013.01)
*H04L 12/801* (2013.01)
*H04W 80/04* (2009.01)
*H04L 29/08* (2006.01)
*H04W 80/06* (2009.01)

(52) U.S. Cl.
CPC ............ *H04L 69/16* (2013.01); *H04W 80/04* (2013.01); *H04W 80/06* (2013.01)

(56) References Cited

U.S. PATENT DOCUMENTS

| | | | |
|---|---|---|---|
| 7,747,720 B2 | 6/2010 | Toebes et al. | |
| 7,792,989 B2 | 9/2010 | Toebes et al. | |
| 8,375,294 B2 | 2/2013 | Toebes et al. | |
| 8,843,636 B1 * | 9/2014 | Wu | H04L 69/04 709/226 |
| 2002/0078164 A1 | 6/2002 | Reinschmidt | |
| 2002/0176443 A1 | 11/2002 | Wei et al. | |
| 2013/0097305 A1 * | 4/2013 | Albal | H04W 76/00 709/224 |
| 2013/0114408 A1 | 5/2013 | Sastry et al. | |
| 2014/0286239 A1 * | 9/2014 | Chowdhury | H04L 1/1812 370/328 |
| 2015/0016261 A1 * | 1/2015 | Backholm | H04L 47/32 370/235 |

OTHER PUBLICATIONS

Everything About Nothing Blog, "Calculating TCP RTO . . . ", [online]. Feb. 5, 2012. [retrieved on Dec. 24, 2013]. Retrieved from the Internet: <URL: http://sgros.blogspot.com/2012/02/calculating-tcp-rto.html>, pp. 1-6.

Cisco White Paper, "Architecture for Mobile Data Offload over Wi-Fi Access Networks", [online]. Apr. 2012. [retrieved on Dec. 24, 2013]. Retrieved from the Internet: <URL: http://www.cisco.com/en/US/solutions/collateral/ns341/ns524/ns673/white_paper_c11-701018.pdf>, pp. 1-23.

Subramanian, U.S. Appl. No. 14/136,062, filed Dec. 20, 2013.

Zhu, U.S. Appl. No. 13/940,327, filed May 20, 2013.

Fujitsu Laboratories, Ltd., "Fujitsu Develops New Data Transfer Protocol Enabling Improved Transmissions Speeds", [online]. Jan. 29, 2013. [retrieved on Sep. 10, 2014]. Retrieved from the Internet: <URL: http://www.fujitsu.com/global/news/pr/archives/month/2013/20130129-02.html>, pp. 1-4.

Bu et al., "On the TCP-Friendliness of VoIP Traffic", INFOCOM 2006, 25th IEEE International Conference on Computer Communications, Proceedings, IEEE, Piscataway, NJ, Apr. 1, 2006, XP031072285, pp. 1-12.

* cited by examiner

CLIENT DEVICE AWARENESS OF NETWORK CONTEXT FOR MOBILE OPTIMZATION

TECHNICAL FIELD

The present disclosure generally relates to optimizing mobile client device operations based on detected network conditions.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The use of Transmission Control Protocol (TCP) for transport of network traffic over wireless links suffers significant losses due to the inability of each TCP flow to learn the maximum throughput available on its path unless the data rate of network traffic is continually increased to the point where packet loss is detected; moreover, TCP is unable to distinguish between losses due to channel errors versus losses due to congestion or losses due to network elements dropping packets during policy enforcement. Use of smart mobile devices concurrently executing multiple mobile applications ("apps") via multiple TCP connections further accelerates congestion due to each mobile application attempting to acquire as much bandwidth as possible via the corresponding TCP connection.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
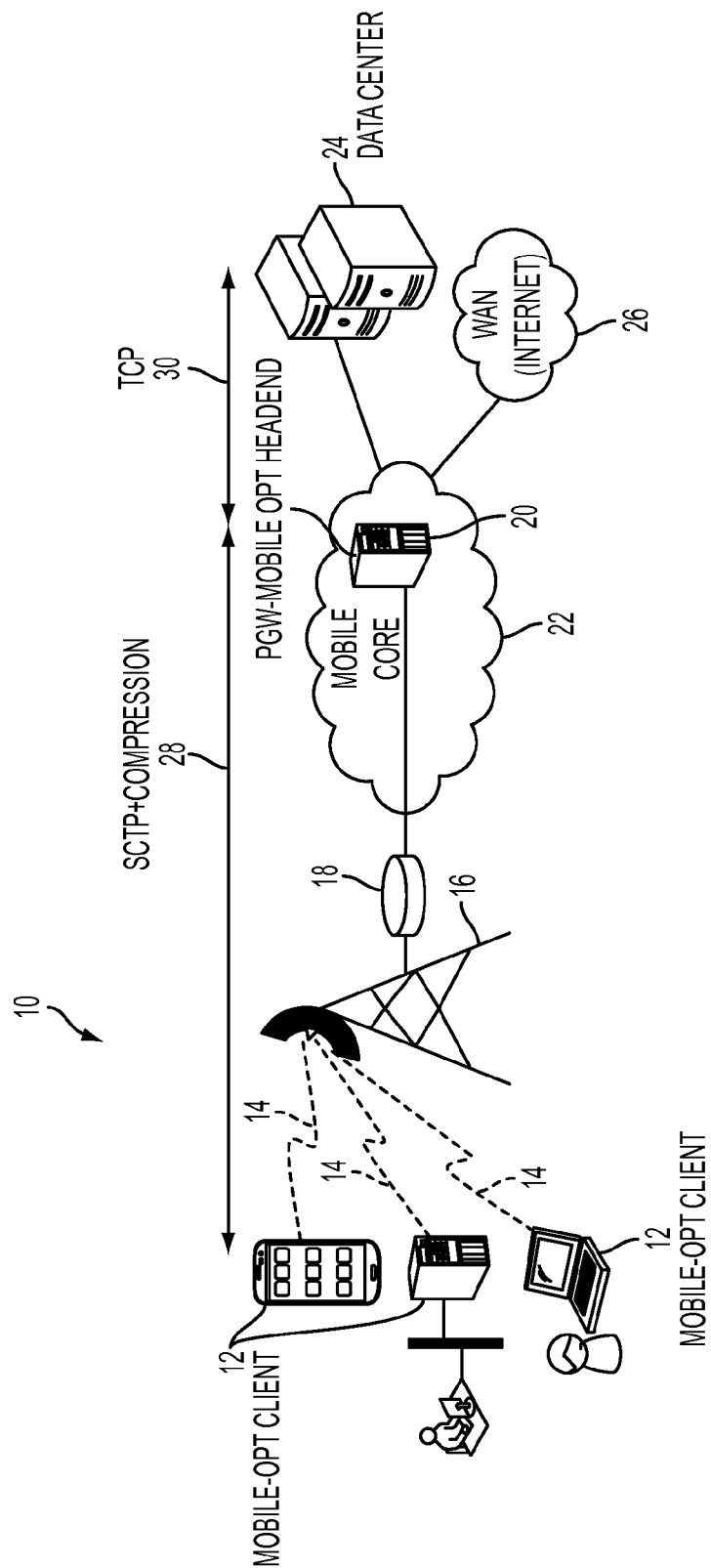
FIGS. 1A and 1B are diagrams illustrating example data networks, each having a client device optimizing a transmission control protocol (TCP) communication based on information from a network device describing network conditions associated with a service provided to the client device via a data network, according to an example embodiment.

In one embodiment, a method comprises obtaining, by a client device via a wireless data link with a wireless access point, information from a network device within a data network reachable via the wireless access point, the information describing network conditions associated with a service provided to the client device via the data network; and the client device optimizing a transmission control protocol (TCP) communication, via the wireless data link, for optimization of the service provided by the client device.

In another embodiment, an apparatus comprises a device interface circuit and a processor circuit. The device interface circuit is configured establishing a wireless data link with a wireless access point, the device interface circuit further configured for obtaining, via the wireless data link, information from a network device within a data network reachable via the wireless access point, the information describing network conditions associated with a service provided to the apparatus operating as a client device via the data network. The processor circuit is configured for optimizing a transmission control protocol (TCP) communication, via the wireless data link, for optimization of the service provided by the client device.

In another embodiment, logic is encoded in one or more non-transitory tangible media for execution by a machine and when executed by the machine operable for: obtaining, by a client device via a wireless data link with a wireless access point, information from a network device within a data network reachable via the wireless access point, the information describing network conditions associated with a service provided to the client device via the data network; and the client device optimizing a transmission control protocol (TCP) communication, via the wireless data link, for optimization of the service provided by the client device.

DETAILED DESCRIPTION

Particular embodiments enable a client device to optimize transmission control protocol (TCP) communications based on obtaining information from one or more network devices within a data network reachable via a wireless access point. The information can describe network conditions associated with a service provided to the client device via the data network. Hence, the client device can adjust (e.g., "tune") selected TCP layer parameters to optimize the TCP communications relative to the network conditions encountered by one or more network-based services provided by the client device to a user of the client device. Examples of optimizing the TCP communications based on client device awareness of network context can include executing a "jump start" to a guaranteed bandwidth for aggressive bandwidth utilization despite advertised network loading, adjusting flow control parameters in the transport layer stack, adjusting round trip time and/or retransmission timeout parameters in the TCP stack, sending a request to a peering network agent for more network resources (e.g., a temporary QoS increase), converting a TCP stream into SCTP streams and adjusting SCTP stream parameters, or other optimization techniques or methods.

Figure 1B:
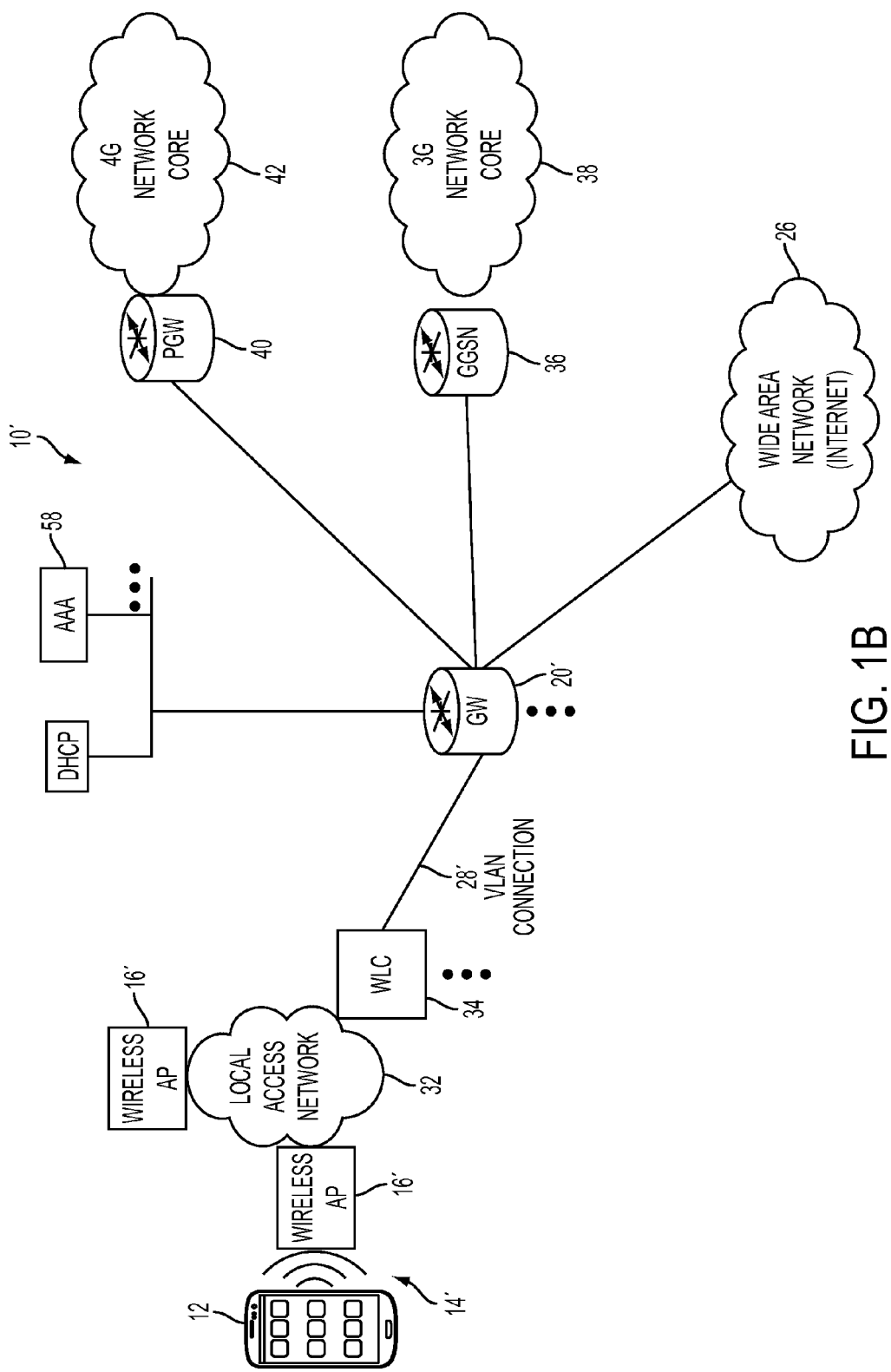

FIG. 1A is a diagram illustrating an example data network 10 having one or more client devices 12 optimizing a transmission control protocol (TCP) communication based on information from one or more network devices describing network conditions associated with a service provided to the client device 12 via a data network 10, according to an example embodiment. FIG. 1B is a diagram illustrating an example data network 10' having a client device 12 optimizing TCP communication based on information from one or more network devices describing the network conditions associated with a service provided to the client device 12 via the data network 10', according to another example embodiment.

FIG. 1A illustrates the client device 12 establishing a wireless data link 14 with a base transceiver station (BTS)

(or "base station") 16 according to a wireless communication protocol, for example a code division multiple access (CDMA) based communication protocol (e.g., CDMA2000 or Interim Standard 95 (IS-95)) or a time division multiple access (TDMA) based communication protocol (e.g., Global System for Mobile Communications (GSM)). The BTS 16 also can be referred to generally herein as a "wireless access point". A base station controller 18 can establish a communication link between a client device 12 and a network device 20 within a service data network 22. The network device 20 can be implemented as a packet gateway that can execute a "headend" operation for the client device 12 for the coordinated optimization of network-based services to the client device 12, for example from a cloud-based data center 24 or other services via a wide area network 26 such as the Internet.

As described in further detail below, the client device 12 can include an execute a "thin" optimization client (also referred to as a "mobile optimization agent") that can establish a secure communications link 28 with the headend executed in the network device 20, for initiation of an optimization session between the optimization client executed in the client device 12 and the headend executed in the network device 20. The optimization session enables the optimization client executed in the client device 20 to obtain, from the network device 20, information describing network conditions associated with one or more network-based services provided to the client device 12 via the service data network 22. Information about network conditions also can be provided by other devices in the network reachable to the client device 12 ("informing devices") if the informing devices have access to network characteristics from the various network devices that are in the network path between the client device 12 and the network device 20 or the destination (e.g., data center 24 or a gateway between the service data network 22 and the wide area network 26). Hence, the client device 12 can obtain awareness of the network conditions in the service data network 22 relevant to the network-based services provided to the client device 12 (i.e., the "network context"), enabling the mobile client device 22 to implement TCP-based optimization of the network-based services. In other words, the network context provided to the client device 12 can include information beyond the mere physical layer (layer 1) characteristics (e.g., RSSI) or data link layer (layer 2) characteristics (e.g., acknowledgement of data packets, flow control packets, etc.) of the wireless data link 14; for example, the information provided to the client device 12 can include static or dynamic policies that can impact client traffic (i.e., network traffic sent or received by the client device 12). Hence, the network context enables the mobile client device 22 to optimize TCP parameters for a TCP communication (comprising a TCP connection 30) with service-based network destinations 24, 26 based on the network context, described below.

FIG. 1B illustrates the client device 12 that can establish a secure or unsecure wireless data link 14' with a wireless access point 16', for example a Wi-Fi (e.g., IEEE 802.11) access point providing a wireless communication link 14' for access to a local access network 32 of a data network 10'. The data network 10' also can include a wireless Local Area Network (LAN) controller (WLC) 34, a gateway 20', a General Packet Radio Service (GPRS) Gateway Service Node (GGSN) 36 for a 3G network core configured for providing 3G network services, and/or a packet gateway (PGW) 40 for a 4G network core 42 configured for providing 4G network services. The gateway 20' can be implemented as a serving gateway service node (SGSN) in a 3G network that includes the GGSN 36 and the 3G network core 38, and/or as a serving gateway in a 4G network that includes the PGW 40 and the 4G network core 42. Hence, the gateway 20' can execute a "headend" operation on behalf of network service provided by a 3G network, a 4G network, a network service provided by a remote destination via the WAN 26, etc.

As described with respect to FIG. 1A, the client device 12 in FIG. 1B can execute a "thin" optimization client that can establish a secure communications link (e.g., a Virtual LAN (VLAN) connection) 28' with the headend executed in the network device 20', for initiation of an optimization session between the optimization client executed in the client device 12 and the headend executed in the network device 20'. The optimization session enables the optimization client executed in the client device 20 to obtain, from the network device 20', information describing network conditions associated with one or more network-based services provided to the client device 12 via the service data network 10'. Hence, the client device 12 can obtain the network context of the service data network 10', enabling the mobile client device 22 to implement TCP-based optimization of the network-based services provided by the 3G network core 38, the 4G network core, via the WAN 26, etc.

Figure 2:
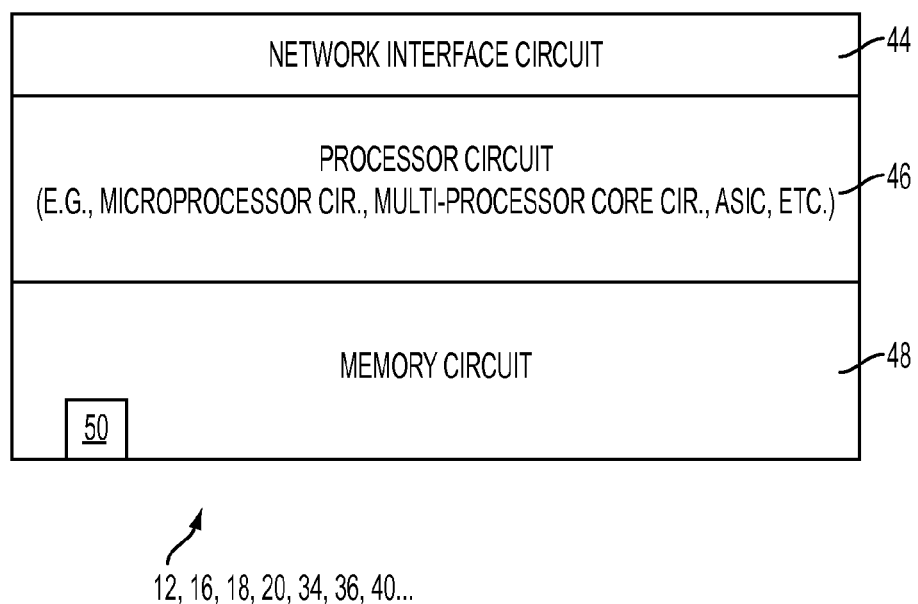
FIG. 2 is a diagram illustrating an example implementation of the client device or any of the network devices of FIG. 1, according to an example embodiment.

FIG. 2 is a diagram illustrating an example implementation of the client device 12 or any of the network devices 16, 16', 18, 20, 20', 34, 36, or 40 of FIG. 1A or 1B, according to an example embodiment. The apparatus 12 (or 16, 16', 18, 20, 20', 34, 36, or 40) is a physical machine (i.e., a hardware device) configured for implementing network communications with other physical machines via the network 10 or 10'.

The apparatus 12 (or 16, 16', 18, 20, 20', 34, 36, or 40) can include a device interface circuit 44, a processor circuit 46, and a memory circuit 48. The device interface circuit (also referred to as a network interface circuit) 44 can include one or more distinct physical layer transceivers for communication with any one of wireless access points 16 or 16'; the network interface circuit 48 also can include an IEEE based Ethernet transceiver for communications with a network device via a wired Ethernet link, a Universal Serial Bus (USB), and/or a fiber optic transceiver, etc. The processor circuit 46 can be configured for executing any of the operations described herein, and the memory circuit 48 can be configured for storing any data or data packets as described herein, for example storage of information describing network conditions ("network context") in a data structure 50.

Any of the disclosed circuits of any of the disclosed devices (including the network interface circuit 44, the processor circuit 46, and the memory circuit 48, and their associated components) can be implemented in multiple forms. Example implementations of the disclosed circuits can include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 3:
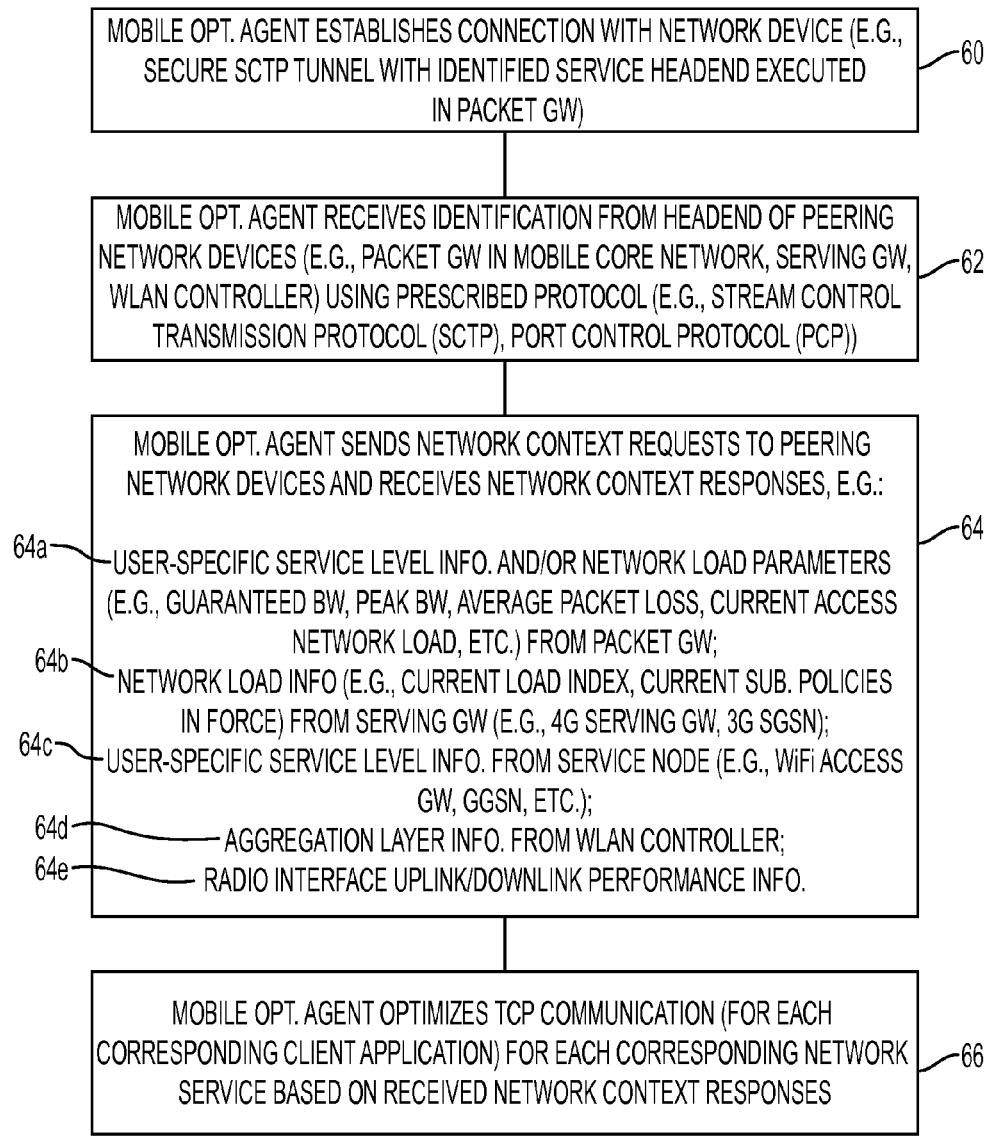
FIG. 3 is a diagram illustrating an example method by the client device of FIG. 1, according to an example embodiment.
Figure 4:
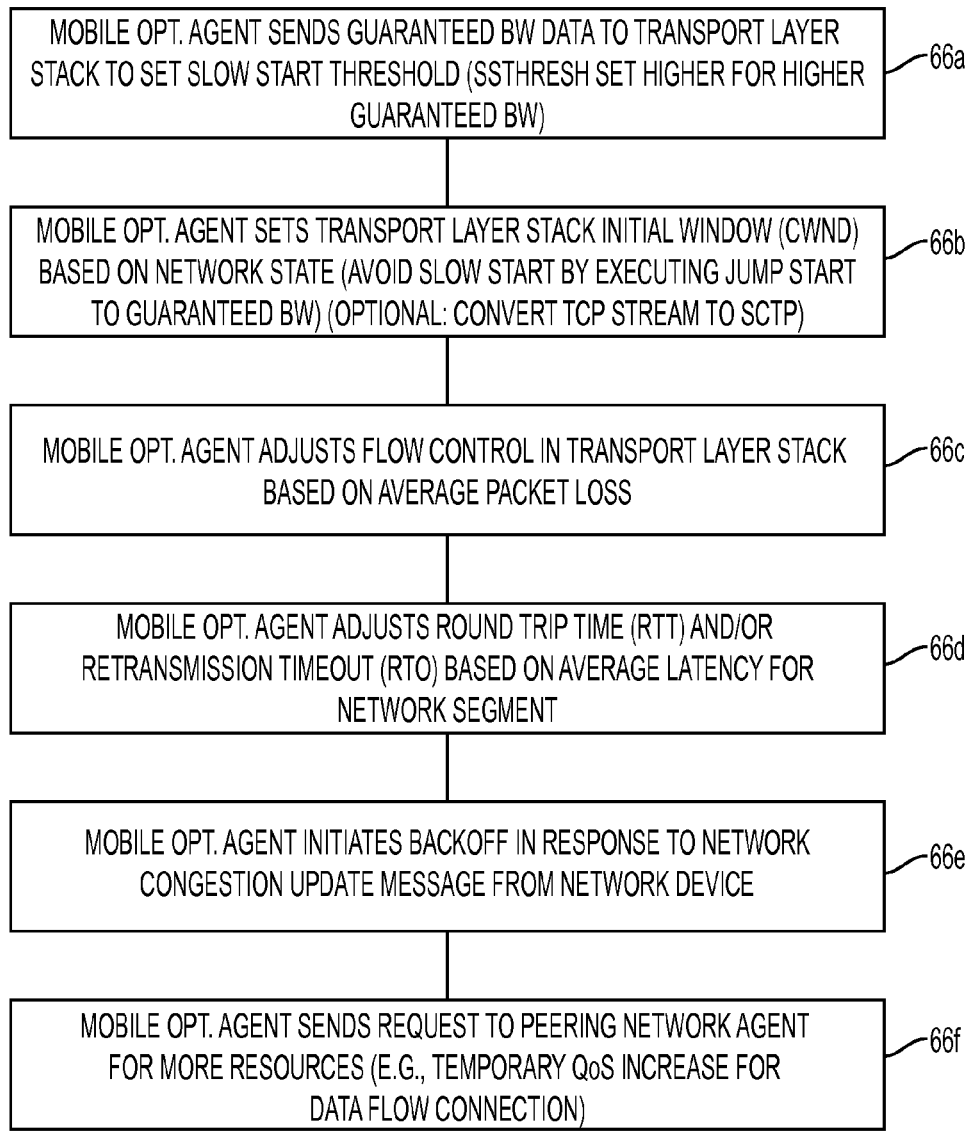
FIG. 4 is a diagram illustrating example operations for optimizing a TCP communication, for optimization of a service provided by the client device, according to an example embodiment.

FIG. 3 is a diagram illustrating an example method by the client device of FIG. 1, according to an example embodiment. FIG. 4 is a diagram illustrating example operations for optimizing a TCP communication, for optimization of a service provided by the client device, according to an example embodiment. The operations described with respect to any of the FIGS. 1-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3, the mobile optimization agent executed by the processor circuit 46 of the client device 12 can establish in operation 60 a connection with a network device such as the network device 20 of FIG. 1A and/or the network device 20' of FIG. 1B, where each network device 20 and 20' executes an identified service headend configured for providing information describing network conditions ("network context") to the client device 12. In one embodiment, the device interface circuit 44 of the client device 12 can establish a wireless data link 14 or 14' with a wireless access point 16 or 16', enabling the processor circuit 46 to establish a secure stream control transmission protocol (SCTP) tunnel 28 with the service headend executed in the packet gateway 20 of FIG. 1A, and/or establish a VLAN connection 28' with the gateway 20' of FIG. 1B.

The processor circuit 46 in the client device 12 executing the mobile optimization agent can initiate a peer-to-peer optimization session with the headend executed by the network devices 20 and/or 20' to obtain network context information. For example, the mobile optimization agent executed in the client device 12 can receive in operation 62 an identification of peering network devices in the service data network 10' or 22 from the headend, enabling the mobile optimization agent in the client device 12 to access different network devices for respective network conditions. For example, the headend executed by the packet gateway 20 of FIG. 1A can supply to the mobile optimization agent an identity of peering network devices such as the base station controller 18, the BTS 16, and/or other network devices associated with providing the network-based services of the data center 24; the headend of the gateway 20' of FIG. 1B (implemented for example as a serving gateway) can supply an identity of peering network devices such as the packet gateway 40 of the 4G network core 42, the serving gateway (e.g., 20' or another gateway) of the 4G network core 42, the serving gateway service node (SGSN) in a 3G network, the GGSN 36 of the 3G network, the wireless LAN controller 34, the wireless access point 16' providing access to the local access network 32, etc. The mobile optimization agent and the headend can establish the peer-to-peer optimization session using a prescribed protocol, for example Stream Control Transmission Protocol (SCTP) or Port Control Protocol (PCP).

The processor circuit 46 executing the mobile optimization agent in the client device 12 in operation 64 can send network context requests to the peering network devices (e.g., 34, 36, 40), and receive network context responses from the peering network devices.

For example, the processor circuit 46 of the client device 12 executing the mobile optimization agent in operation 64*a* can request and receive user-specific service level information from the packet gateway 20 of FIG. 1A, enabling the mobile optimization agent to determine the available guaranteed quality of service (QoS) for the client device 12 for a corresponding network service; the mobile optimization agent in operation 64*a* also can request and receive network load parameters, for example guaranteed bandwidth, peak bandwidth, average packet loss, current access network load, etc., from the packet gateway 20 of FIG. 1A. The mobile optimization agent in operation 64*e* also can request radio interface uplink/downlink information from the wireless access point 16 and/or the base station controller 18, enabling the processor circuit 46 in operation 66 to optimize the TCP communication parameters relative to the radio interface information of the wireless link, the network loading in the service data network 22, and/or the user-specific service level policies in the service data network 22 and/or the data center 24.

In the example of FIG. 1B, the mobile optimization agent executed by the processor circuit 46 in the client device 12 in operation 64*b* can request and receive network load information from a serving gateway 20' for the 3G network (e.g., 3G SGSN) and/or the 4G network (e.g., 4G serving gateway), or from the packet gateway 40: example load information received by the client device 12 from the packet gateway can include current load index, current subscriber policies in force, average packet loss detected on a network segment, average latency detected on a network segment, whether a detected problem (e.g., congestion) is detected requiring a flow control or "backoff" operation, whether dynamic bandwidth is supported, etc. The information from the serving gateway also can specify whether the client device 12 can request temporary increases in QoS upon appropriate billing and authorization from an Authorization, Authentication, and Accounting (AAA) server 58.

The mobile optimization agent executed in the client device 12 in operation 64*c* can request and receive user-specific service level information from a service node, for example a Wi-Fi access gateway (WAG), the GGSN 36 of the 3G network, the PGW 40 of the 4G network, etc.: the user-specific service level information can specify guaranteed QoS parameters available to the client device 12 (e.g., guaranteed bandwidth for prescribed time intervals, etc.).

The mobile optimization agent executed in the client device 12 in operation 64*d* can request and receive aggregation information from the wireless LAN (WLAN) controller (WLC) 34. Example aggregation information can include client device-related max/min throughput of data traffic, current load index (e.g., whether data traffic in the local access network 32 is overloaded due to a large number of users consuming heavy amounts of data traffic, and identification of policies, etc.). The mobile optimization agent executed in the client device 12 in operation 64*e* also can request and receive radio interface uplink/downlink performance regarding the wireless interface characteristics of the wireless data link 14' from the wireless AP 16', including uplink channel information, downlink channel information, and the load index identifying whether too many client devices are connecting to the wireless access point 16'.

Hence, the network context information received in the network context responses by the client device 12 in operation 64 enables the client device 12 to obtain accurate and precise information of the status of the client device 12 relative to the state of the network 10' or 22. The processor circuit 46 executing the mobile optimization agent in operation 66 can optimize each TCP communication, for each network-based application executed in the client device 12, based on the received network context responses.

FIG. 4 is a diagram illustrating example operations 66 of FIG. 3 by the processor circuit 46 in the client device 12 for optimizing a TCP communication, for optimization of a service provided by the client device, according to an example embodiment. The mobile optimization agent can send in operation 66*a* the received guaranteed bandwidth data to the transport layer stack in order to set a Slow Start Threshold (SSTHRESH) parameter in the TCP stack; in particular, the SSTHRESH parameter can be set to a higher value for if a higher guaranteed bandwidth is specified. The mobile optimization agent in operation 66*b* also can set the Initial Window (CWND) in the transport layer stack based on network state; hence, the setting of the SSTHRESH and/or CWND parameters enable avoidance of TCP slow start based on executing a "jump start" to the guaranteed bandwidth. The mobile optimization agent also can convert the TCP streams into SCTP streams and adjust the flow control and congestion control in SCTP.

The mobile optimization agent executed by the processor circuit 46 in the client device 12 also in operation 66*c* can adjust flow control parameters in the transport layer stack based on the average packet loss information received in operation 64. The mobile optimization agent in the client device 12 also can adjust in operation 66*d* the round trip time (RTT) and/or retransmission timeout (RTO) parameters in the TCP stack based on the average latency for a network segment. The mobile optimization agent in the client device 12 also can initiate a backoff operation 66*e* in response to a network congestion update message received from a network device.

Hence, the mobile optimization agent in the client device 12 can aggressively utilize bandwidth (e.g., executing jump start operations), even if the wireless AP 16' advertises network loading, based on received network context information that the network 10' beyond the wireless link 14' is capable of providing higher QoS services for the client device 12. The mobile optimization agent in the client device 12 also can send in operation 66*e* a request to a peering network agent for more network resources, for example a temporary QoS increase for a data flow connection (e.g., a TCP connection or an SCTP connection); in this case, the peering network agent (e.g., the serving gateway 20') can grant the temporary QoS after authentication and billing by the AAA server 58, for example a temporary QoS increase for mobile high definition video (e.g., mobile video on demand, mobile Netflix or Hulu service in HD format, etc.).

According to example embodiments, a thin mobile optimization client executed on a mobile client device 12 can communicate with network elements to receive updates regarding information regarding network context including current network state, network policies, user profile, etc. The network context information can be used by the client device 12 to dynamically adjust TCP parameters for optimized TCP communications of a network-based service provided via a wireless data link by the client device.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    obtaining, by a client device via a wireless data link with a wireless access point, information from a network device within a network core of a data network reachable via the wireless access point, the information describing network conditions associated with a service provided to the client device via the data network, the network conditions distinct from any conditions of the wireless data link; and
    the client device optimizing a transmission control protocol (TCP) communication, via the wireless data link, based on adjusting one or more selected TCP parameters based on the network conditions for optimization of the service provided to the client device via the data network and provided by the client device to a user of the client device.

2. The method of claim 1, wherein the optimizing includes optimizing each TCP communication for each corresponding application executed by the client device for a corresponding service provided via the data network.

3. The method of claim 1, wherein the obtaining includes:
accessing the network device, via the wireless access point, based on establishing a secure connection with the network device via the data network; and
receiving the information from the network device via the secure connection.

4. The method of claim 1, wherein the information includes an identification of at least one of guaranteed bandwidth allocated for a user of the client device, peak bandwidth allocated for the user of the client device, average packet loss observed on a network segment of the data network, whether dynamic bandwidth allocation is available, or a load metric identifying a relative load of at least the network segment.

5. The method of claim 1, wherein the network device is a serving gateway enforcing policies in the data network, the information including an identification of peering network agents in the data network and configured for responding to network context queries from the client device, enabling the client device to obtain respective network context responses from any one of the peering network agents.

6. The method of claim 5, wherein the peering network agents include a packet gateway providing service level information to the client device, a serving gateway providing network load information including current load index and current subscriber policies in force, and a wireless local area network (LAN) controller providing aggregation layer information, enabling the client device to obtain respective network context responses from any one of the peering network agents, for optimizing the TCP communication.

7. The method of claim 5, wherein the optimizing includes converting a TCP stream in the TCP communication into an SCTP stream and adjusting associated parameters for flow control and congestion control.

8. The method of claim 5, further comprising sending a request to one of the peering network agents for a temporary increase of Quality of Service (QoS) for the TCP communication.

9. An apparatus comprising:
a device interface circuit configured establishing a wireless data link with a wireless access point, the device interface circuit further configured for obtaining, via the wireless data link, information from a network device within a network core of a data network reachable via the wireless access point, the information describing network conditions associated with a service provided to the apparatus operating as a client device via the data network, the network conditions distinct from any conditions of the wireless data link; and
a processor circuit configured for optimizing a transmission control protocol (TCP) communication, via the wireless data link, based on adjusting one or more selected TCP parameters based on the network conditions for optimization of the service provided to the client device via the data network and provided by the client device to a user of the client device.

10. The apparatus of claim 9, wherein the processor circuit is configured for optimizing each TCP communication for each corresponding application executed by the client device for a corresponding service provided via the data network.

11. The apparatus of claim 9, wherein the device interface circuit is configured for obtaining the information based on:
accessing the network device, via the wireless access point, based on establishing a secure connection with the network device via the data network; and
receiving the information from the network device via the secure connection.

12. The apparatus of claim 9, wherein the information includes an identification of at least one of guaranteed bandwidth allocated for a user of the client device, peak bandwidth allocated for the user of the client device, average packet loss observed on a network segment of the data network, whether dynamic bandwidth allocation is available, or a load metric identifying a relative load of at least the network segment.

13. The apparatus of claim 9, wherein the network device is a serving gateway enforcing policies in the data network, the information including an identification of peering network agents in the data network and configured for responding to network context queries from the client device, enabling the processor circuit to obtain respective network context responses from any one of the peering network agents.

14. The apparatus of claim 13, wherein the peering network agents include a packet gateway providing service level information to the client device, a serving gateway providing network load information including current load index and current subscriber policies in force, and a wireless local area network (LAN) controller providing aggregation layer information, enabling the processor circuit to obtain respective network context responses from any one of the peering network agents, for optimizing the TCP communication.

15. The apparatus of claim 13, wherein the processor circuit is configured for optimizing the TCP communication based on converting a TCP stream in the TCP communication into an SCTP stream and adjusting associated parameters for flow control and congestion control.

16. The apparatus of claim 13, wherein the processor circuit is configured for sending a request to one of the peering network agents for a temporary increase of Quality of Service (QoS) for the TCP communication.

17. Logic encoded in one or more non-transitory tangible media for execution by a machine and when executed by the machine operable for:
obtaining, by a client device via a wireless data link with a wireless access point, information from a network device within a network core of a data network reachable via the wireless access point, the information describing network conditions associated with a service provided to the client device via the data network, the network conditions distinct from any conditions of the wireless data link; and
the client device optimizing a transmission control protocol (TCP) communication, via the wireless data link, based on adjusting one or more selected TCP parameters based on the network conditions for optimization of the service provided to the client device via the data network and provided by the client device to a user of the client device.

18. The logic of claim 17, wherein the optimizing includes optimizing each TCP communication for each corresponding application executed by the client device for a corresponding service provided via the data network.

19. The logic of claim 17, wherein the obtaining includes:
accessing the network device, via the wireless access point, based on establishing a secure connection with the network device via the data network; and receiving the information from the network device via the secure connection.

20. The logic of claim 19, wherein the network device is a serving gateway enforcing policies in the data network, the information including an identification of peering network agents in the data network and configured for responding to network context queries from the client device, enabling the client device to obtain respective network context responses from any one of the peering network agents.

* * * * *